March 18, 1969     H. R. MILLER     3,433,927
METHOD FOR ESTABLISHING AND CLOSING AN ARC WELD
Filed May 21, 1964     Sheet 1 of 2

INVENTOR.
HOWARD R. MILLER
BY
ATTORNEY

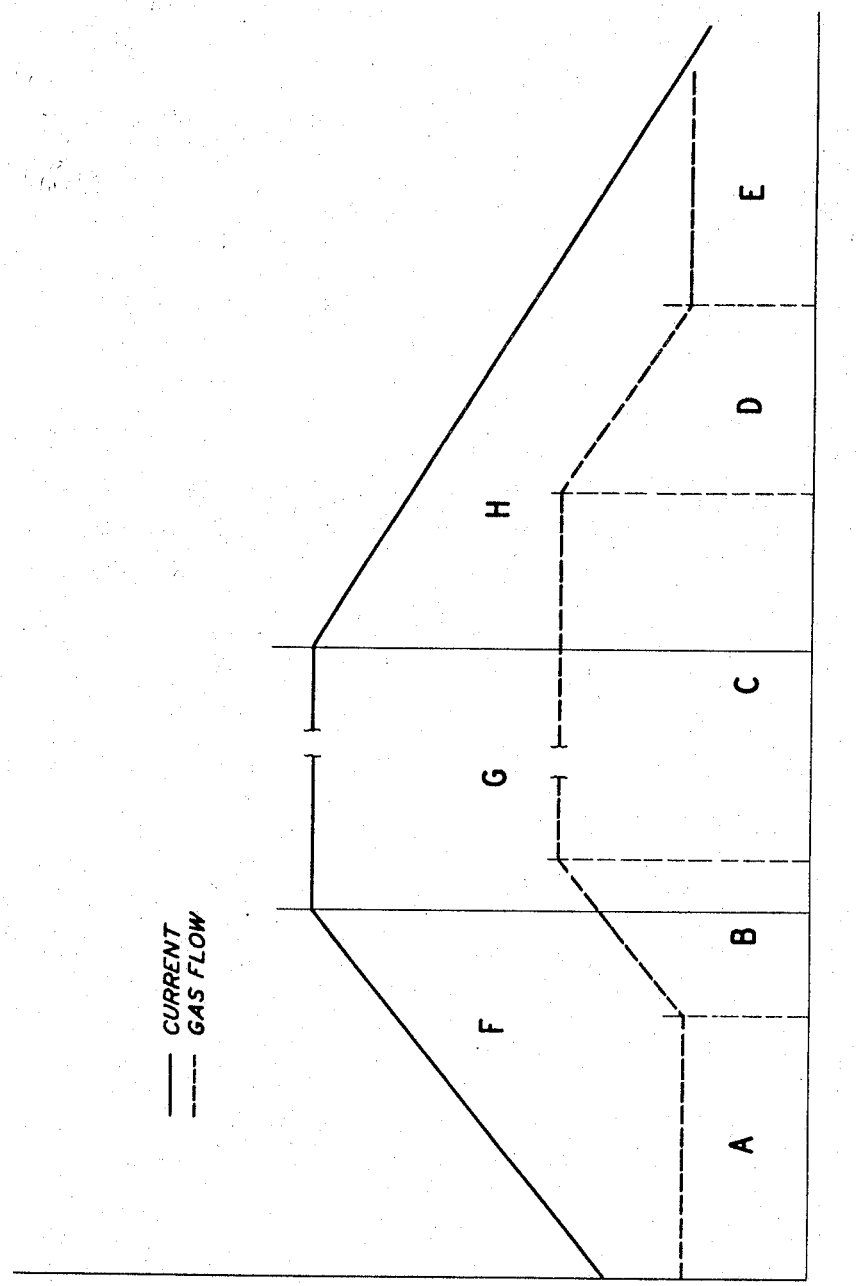

United States Patent Office 3,433,927
Patented Mar. 18, 1969

3,433,927
METHOD FOR ESTABLISHING AND CLOSING AN ARC WELD
Howard R. Miller, Clark, N.J., assignor to Union Carbide Corporation, a corporation of New York
Filed May 21, 1964, Ser. No. 369,060
U.S. Cl. 219—137          8 Claims
Int. Cl. B23k 9/00, 9/16, 9/10

ABSTRACT OF THE DISCLOSURE

A method for establishing and closing a plasma arc weld wherein a keyhole is developed in the work to be welded by gradually increasing the arc current and gas flow rate from a low level to operating value and wherein the keyhole is closed by gradually decreasing the current in the arc to substantially zero while decreasing the rate of gas flow from the welding rate to a minimum over a predetermined time interval.

---

This invention relates to a method for electric arc welding and, more particularly, to a method for establishing and closing a plasma arc weld.

In recent years a new welding process has been developed. This process is known as plasma arc welding and is distinguished by a high energy density arc effluent containing a stream of hot gas commonly referred to as "plasma." One of the advantages of this process is that the force of the arc effluent penetrates the work to be welded so that better weld penetration is obtained as compared with tungsten-inert-gas welding, for example. Better penetration is obtained because it is possible to obtain a "keyhole" effect with plasma arc. Keyholding describes a technique of penetrating or piercing the workpiece with the arc effluent to produce a hole through the work and then moving the hole produced by the arc effluent along the line of weld while allowing the molten metal to flow around the arc effluent and unite behind such effluent to form a weld.

The keyhole technique is used in plasma arc welding square butt joint preparations on most materials in the range of 0.090 to 0.250 in. thickness range. Keyholding can also be used for welding V or U groove joint preparations on thicker materials provided the root face dimension falls approximately within the above limits.

One of the shortcomings of the keyhole technique was that at the end of the weld there remained a hole pierced through the work. Accordingly, the end section of the work containing the hole was wasted. Another shortcoming was that frequently on starting the weld, the arc effluent was allowed to pierce the work and then relative movement between the arc and work was started; this procedure was not acceptable for making welds, such as circumferential welds, especially in material ⅛ in. or thicker. The diameter of the pierced hole at the start was usually larger than the width of the weld bead and penetration at the point where the arc pierced the plate was excessive, that is, the metal was melted and blown away rather than keyholed in behind the arc effluent.

When using the plasma arc keyhole technique for welding circumferential joints which have to be overlapped and tied-in, the manner in which the keyhole is established at the start of the weld and closed at the end of the weld becomes a critical problem. The surface of the weld at the start has to be smooth so that it can be overlapped properly. At the end of the weld the keyhole has to be closed and the weld crater eliminated.

Up until now there has not been a successful method for closing the keyhole in plasma arc welding and in some cases, such as circumferential joints, the starting techniques practiced to-date are not amenable to overlapping and tieing-in the end of the weld.

Accordingly, it is a primary object to provide a method for closing the keyhole formed in plasma arc welding.

A further object is to provide a method for closing the keyhole formed in plasma arc welding material about 0.090 to about 0.250 in. thick.

Another object is to provide a method for establishing and closing the keyhole in plasma arc welding.

Yet another object is to provide a method for establishing and closing the keyhole in plasma arc welding circumferential joints.

The achievement of these and other objectives will become apparent from the following description and drawings wherein:

FIGURE 4 is a graphic illustration of how current and gas flow may be varied according to the invention;

My invention is predicated on the discovery that the keyhole effect in plasma arc welding can be established or closed by providing a gradual, smooth transition of arc forces and heat input to the weld whereby the transition from no penetration to keyholing and back again is as smooth as possible.

Since, in its broadest aspects, the object of the invention is to achieve a smooth transition to and from the point of keyholing, several combinations of welding variables may be controlled to produce the desired effect of arc forces and heat input. For example, it is possible to vary the relative speed between the arc and workpiece. This type of modification is within the scope of the invention being claimed. However, in my preferred embodiment, which will be described in greater detail hereinafter, arc current and gas flow are varied over a predetermined time interval while providing relative motion between the arc and workpiece to produce a smooth, gradual change in weld penetration from and to the point of keyholing.

The relationship between the rates of change of current and gas flow depends on the density, fluidity and the thermal conductivity of the material being welded, as well as the composition of the arc gas. On starting, in most cases it is not possible to increase the arc current alone while holding the arc gas flow at the operating value as the force of the effluent gouges the weld puddle before the keyhole is established. It is also not possible to increase orifice gas flow alone while holding the current constant at its welding value because: (1) the heat load in the torch nozzle may be excessive at the lower gas flow, and (2) a relatively large welding puddle is developed and the effluent gouges it out just prior to piercing the plate. At the end of the weld the arc welding current cannot simply be turned off because the keyhole will not close. Both the welding current and gas flow must be decreased gradually to close the keyhole and fill in the weld. If either parameter is varied alone while the other is held constant, the weld puddle is gouged and the surface of the weld is severely undercut.

Having described the invention generally, reference will now be made to the drawings to particularly describe the invention.

Figure 1:
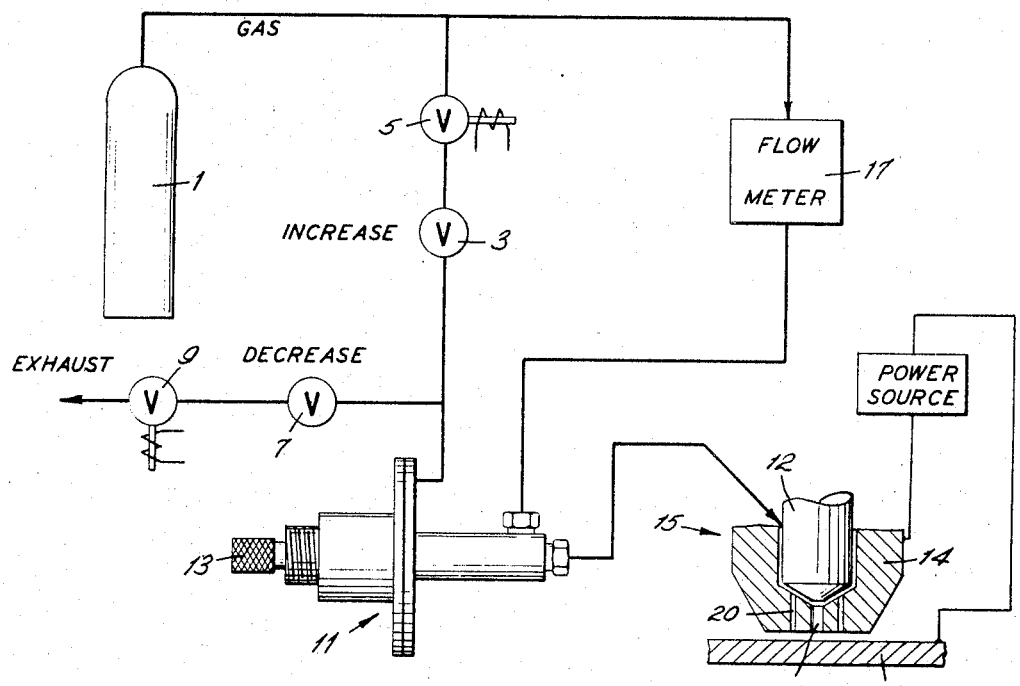
FIGURE 1 is a schematic flow diagram of a typical system for controlling gas flow in accordance with my invention.

FIGURE 1 illustrates a typical system for providing desired control of the gas flow pattern. A gas source 1 is connected in flow relationship with a solenoid valve 5. Valve 5 is connected on the downstream side thereof to a valve 3. Valve 3 controls the gas flow rate to a linear flow control valve 11. Control valve 11 provides the linear increase or upsloping of the gas flow as will be described hereinafter. Similarly, a flow rate control valve 7 is connected to solenoid valve 9. Solenoid valve 9 is normally closed when solenoid valve 5 is opened. Valve 7 is connected to valve 11 and controls the rate of the decrease or down-sloping of the gas flow. Adjustment nut 13, on valve 11, provides for control over the amount of gas flow. Threading nut 13 into the valve 11 decreases gas flow while threading nut 13 out of valve 11 increases gas flow. The amount of gas supplied to torch 15 from source 1 flows through a flowmeter 17 and is supplied to valve 11 which is capable of providing the amount of gas desired at linear flow increase or decrease.

The torch 15 basically consists of a nonconsumable electrode 12 aligned with and adjacent to one end of a nozzle 14. The nozzle has a constricting center passage 16 through which the arc passes together with the arc gas. Preferably the torch 15 is provided with a nozzle that has additional gas orifices 20 on either side of the center passage 16 in the nozzle. These orifices straddle the line of weld and help shape the arc. Such nozzles are referred to as multiport nozzles.

Figure 2:
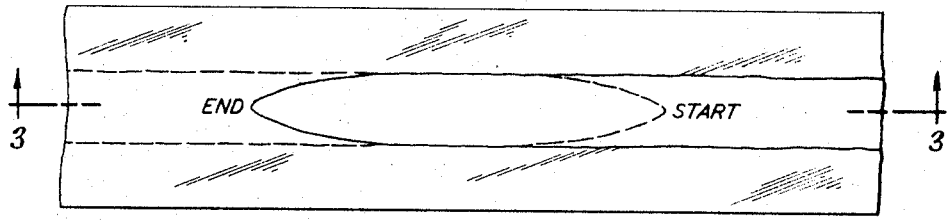
FIGURE 2 is a top view of an overlapped weld bead made by the process of the invention.
Figure 3:
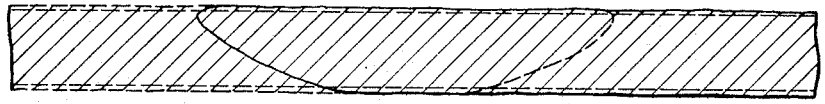
FIGURE 3 is a cross section view taken along the line 3—3 in FIGURE 2.

In operation when a weld is to be made, an arc is established between the torch 15 and the workpiece W at a starting current and gas flow. The current and gas flow are gradually increased from these starting values up to welding current and gas flow as relative motion is provided between the torch and work over a time interval such that the transition from no keyhole to keyhole is smooth and gradual as shown in FIGURES 2 and 3 by dotted lines.

In the system shown in FIGURE 1, the increase in gas flow is achieved by opening valve 5 and adjusting valve 3 to provide the desired gas flow rate to linear control valve 11. The gas supplied by valve 3 to valve 11 controls the rate at which the valve 11 opens. Arc gas is supplied from source 1 through flowmeter 17 to linear control valve 11. Control valve 11 is provided with means for delivering gas to the torch 15 at linear flow as the valve 11 is opened. FIGURE 4 illustrates generally the shape of the current pattern and gas flow pattenr necessary for practicing the invention. The length of the various segments A through H can be varied as will be described in the examples hereinafter. After the keyhole is achieved the weld is continued until the end is reached. At the end of the weld the current and gas flow are decreased to provide a smooth, gradual transition from the point of keyholing to the end of the weld as shown in FIGURES 2 and 3 by the solid lines. FIGURES 2 and 3 illustrate a section of circumferential weld wherein the end of the weld ties in with and overlaps the start of the weld.

In FIGURE 4, segment A depicts the length of time delay before the gas flow is started to be increased. Segment B illustrates the time and slope of the gas flow increase. Segment C is the welding gas flow. Segment D illustrates the time and slope of gas flow decrease. Segment E depicts final gas flow conditions. Segment F illustrates the time and slope of current increase. Segment G is weld current. Segment H illustrates slope and time of current decrease.

Generally, according to my invention, the current and gas flow may be simultaneously increased. In such case, the segment A in FIGURE 4 would be zero. Also, current may be increased and after a predetermined time delay the gas flow may be increased; in this case, segment A would be as illustrated.

At the end of the weld the current is usually started down before the gas flow is decreased so that segment H commences before segment D in FIGURE 4. However, when the work is titanium it has been found that it is more desirable to start segment D before segment H in order to minimize undercutting. In order that those skilled in the art may more readily understand how to practice my invention on various materials and thicknesses of materials, the following examples are presented:

EXAMPLE I

A root-pass weld was made in ¼ in. thick stainless steel having a square butt joint preparation. The arc voltage was 28 volts; shielding gas flow through the torch was 60 c.f.h. argon; travel speed of the work was 10 i.p.m. A gas backup of 60 c.f.h. argon was used on the underside of the weld. A multiport nozzle having 0.136 in. center passage and two 0.040 in. side passages on ⅜ in. center distance was used on the torch. The electrode was ⅛ in., 2% thoriated tungsten electrode. Electrode set back from the entrance to the center passage was 0.125 in. The torch was spaced 3/16 in. from the work. The work was preheated to 400° F. and 60 c.f.h. argon trailing shield was used. The arc was initiated at 125 amperes and was increased to 240 amperes over a slope time of 10 seconds (segment F, FIGURE 4). Simultaneously (segment A is zero) gas flow through the center passage of the nozzle was increased from 5 c.f.h. to 12 c.f.h. over a slope time of 8 seconds (segment B). At the end of the weld the current was started down first and was then decreased to zero in 14 seconds (segment H). The gas flow was started down after the current was started down but before the zero value was reached. The gas flow was decreased from 12 c.f.h. to 5 c.f.h. in 12 seconds (segment D).

The weld produced had a smooth, gradual transition from no keyhole to keyhole and back again, as shown in FIGURES 2 and 3.

The same welding conditions described in Example I, except that no preheat was employed, was used to weld ¼ in. thick, 18% nickel maraging steel. "Maraging" is a term applied to a group of extra low-carbon, high-nickel martensitic steels. These steels are strengthened by an age hardening mechanism which occurs upon heating the low-carbon martensitic structure at moderate temperatures after austenitizing at 1,500° F. and cooling to ambient or subambient temperatures. The term "maraging" is derived from aging of the martensite.

EXAMPLE II

⅜ in., D–6ac steel

D–6ac steel has substantially the following chemical composition: 0.44% carbon, 0.80% manganese, 0.97% chromium, 0.49% nickel, 1.03% molybdenum, 0.014% phosphorus, 0.007% sulfur, 0.19% silicon, 0.080% vanadium, balance iron.

The joint preparation was a 60° single V-groove with 3/16 in. root face. Shielding gas was argon flowing at 60 c.f.h. Argon, at 45 c.f.h., was also used as a backing gas on the underside of the weld. The electrode and nozzle in the torch were the same as described in Example I. The electrode was set back from the nozzle 0.125 in. and the torch-to-work distance was 5/16 in. In this case the work was preheated to 600° F. An arc was established between the electrode and work at 140 amperes and 34 volts. The torch was moved at 10 i.p.m. The arc gas flow was started at 5 c.f.h. The current was increased from 140 amperes to 275 amperes in 10 seconds. The gas flow was increased from 5 c.f.h. to 20 c.f.h. in 12 seconds. There was no delay between arc initiation and the start of gas flow increase (segment A in FIGURE 4 was zero). At the end of the weld the start of current and gas flow decrease was almost simultaneous. Current was decreased from 275 amperes to 0 amperes in 12 seconds (segment H of FIGURE 4). Gas flow was decreased from 20 c.f.h. to 5 c.f.h. in 8 seconds.

The weld produced had the contour shown in FIGURES 2 and 3.

EXAMPLE III

3/16 in. titanium with 6% aluminum and 4% vanadium

The joint preparation was square butt. Shielding gas was argon at 100 c.f.h. Argon was passed under the back-side of the weld at 3 c.f.h. The torch was the same as in the previous examples. The torch-to-work distance was ¼ in. There was no preheat of the work. A trailing shield of 80 c.f.h. of argon was used. The arc was initiated at 125 amperes and travel between the torch and work was 10 i.p.m. The current was sloped up (segment F of FIGURE 4) from 125 to 175 in 21 seconds. Gas flow was sloped up from 5 c.f.h. to 16 c.f.h. in 3 seconds, 22 seconds (segment A) after the arc was initiated. At the end of the weld current was sloped down from 175 amperes to 0 amperes in 35 seconds and gas flow was sloped down from 16 c.f.h. to 5 c.f.h. in 5 seconds. Decrease of the gas flow was initiated prior to the initiation of welding current decrease.

The above examples are provided by way of illustration only and are indicative of the various materials and conditions under which the process of the invention may be carried out. These examples should not be interpreted as limitations on the invention.

What is claimed is:

1. A method for plasma arc welding which comprises establishing a plasma effluent between a plasma device and a workpiece, said plasma effluent containing an arc at a first current level and a stream of gas flowing at a first flow rate; causing relative motion between said plasma effluent and said workpiece; increasing the arc current and gas flow rate from said first levels to welding arc curent and gas flow rate over a time interval such that the resulting increase in arc force and heat input to the workpiece will smoothly increase weld penetration until a keyhole is established; and continuing said relative motion between the plasma effluent and work at welding current and gas flow.

2. A method for terminating a plasma arc weld wherein a keyhole has been established in the work to be welded by causing relative motion between said work and a plasma effluent containing a welding arc and a welding gas stream which comprises decreasing the current in said arc from welding current to substantially zero and decreasing the rate of gas flow from the welding rate to a minimum over a predetermined time interval such that the resulting decrease in arc force will smoothly decrease weld penetration until the keyhole is closed and the weld crater is filled in.

3. A method according to claim 2 wherein the work has a thickness of from about 0.090 to about 0.250 in. thick.

4. A method according to claim 2 wherein the work has a "V" or "U" groove joint preparation with a root face of between about 0.090 to about 0.250 in.

5. Method according to claim 2 wherein the initiation of welding current decrease in such arc is before initiation of gas flow rate from welding rate to a minimum.

6. Method according to claim 2 wherein said work is titanium and initiation of gas flow from welding rate to a minimum is before initiation of welding current decrease in such arc to about zero.

7. A method for making a circumferential plasma arc weld wherein the start of the weld is overlapped by the end of the weld which comprises establishing a plasma effluent between a plasma device and a circumferential workpiece; said plasma effluent containing an arc at a first current level and a stream of gas flowing at a first flow rate; causing relative motion between said plasma effluent and said workpiece; increasing the arc current and gas flow rate from such first levels to welding arc current and gas flow rate over a time interval such that the resulting increase in arc force and heat input to the workpiece will smoothly increase weld penetration until a keyhole is established; continuing said relative motion around the work between the plasma effluent and the circumferential work at welding current and gas flow until the end of the weld is approached and then decreasing the current from welding current to essentially zero current and the gas flow rate from the welding rate to a minimum over a time interval such that the resulting decrease in arc force will smoothly decrease weld penetration until the keyhole is closed and the weld crater is filled in.

8. A method for making a circumferential plasma arc weld in titanium wherein the start of the weld is overlapped by the end of the weld which comprises establishing a plasma effluent between a plasma device and a circumferential workpiece; said plasma effluent containing an arc at a first current level and a stream of gas flowing at a first flow rate; causing relative motion between said plasma effluent and said workpiece; increasing the arc current and gas flow rate from such first levels to welding arc current and gas flow rate over a time interval such that the resulting increase in arc force and heat input to the workpiece will smoothly increase weld penetration until a keyhole is established; continuing said relative motion around the work between the plasma effluent and the circumferential work at welding current and gas flow until the end of the weld is approached and then first starting to decrease the gas flow rate from the welding rate to a minimum and while decreasing said gas flow starting to decrease the current from welding current to essentially zero current over a time interval such that the resulting decrease in arc force will smoothly decrease weld penetration until the keyhole is closed and the weld crater is filled in.

References Cited

UNITED STATES PATENTS

| 2,151,378 | 3/1939 | Elsey et al. | 219—135 |
| 2,152,785 | 4/1939 | Blankenbuehler | 219—135 |
| 2,897,343 | 7/1959 | Regnauld et al. | 219—135 |
| 3,226,523 | 12/1965 | Filipski et al. | 219—74 |

OTHER REFERENCES

"Plasma Arc Welding," by Stanley P. Filipski in Welding Journal, November 1964 (based on paper presented at the AWS Fall Meeting held in Boston, Mass., during Sept. 30 to Oct. 3, 1963), pp. 937–943.

RICHARD M. WOOD, *Primary Examiner.*

J. GREGORY SMITH, *Assistant Examiner.*